United States Patent [19]

Vitcenda et al.

[11] Patent Number: 4,600,585
[45] Date of Patent: Jul. 15, 1986

[54] FEEDING REGIMEN FOR MINIMIZING WEANING STRESS

[75] Inventors: Marie A. Vitcenda; Alfred J. Zmolek, both of Elroy, Wis.

[73] Assignee: Merrick's, Inc., Middleton, Wis.

[21] Appl. No.: 573,062

[22] Filed: Jan. 23, 1984

[51] Int. Cl.⁴ .............................................. A23L 1/42
[52] U.S. Cl. ...................................... 426/2; 426/580; 426/635; 426/807
[58] Field of Search ............... 426/807, 580, 635, 636, 426/2; 424/95

[56] References Cited

PUBLICATIONS

Miller–Dairy Cattle Feeding and Nutrition-1979-(Academic Press) pp. 308–317.
Morrison–Feeds and Feeding-22nd edit.-1957 (Morrison Pub. Co.) pp. 672–675.
Kaff-C Milk Replacer Pellets Label *Quantock Longlife*, brochure.

Primary Examiner—Sam Rosen
Attorney, Agent, or Firm—Merchant, Gould, Smith, Edell, Welter & Schmidt

[57] ABSTRACT

A method for avoiding weaning stress is disclosed including feeding solid feed and a liquid milk material up through at least fourteen days of age and then eliminating the liquid milk material.

14 Claims, No Drawings

FEEDING REGIMEN FOR MINIMIZING WEANING STRESS

FIELD OF THE INVENTION

The present invention relates to a method for treating bovine to minimize and/or eliminate shock due to weaning from a fluid milk diet.

BACKGROUND OF THE INVENTION

Historically, dairy calves have been weaned at an early age to permit sale of the milk produced by the cow. Typically the calf will be weaned from nursing at between three and five days of age. In the past, such weaning has been a matter of converting the calf to a liquid milk diet ingested, for example, from a bucket or other container. At about three weeks of age the calf is then weaned from the liquid diet and converted to a solid diet of grain, hay and pelleted feeds. At the time of weaning the calf from the liquid milk diet to the dry grain, hay and pelleted feed, the calf sustains a shock that sets back its growth pattern for several weeks. It is not uncommon for a calf to lose significant weight during this period. Although the reasons for this period of shock may not be completely understood, it is our belief that it has to do with the development of the four compartmented stomach of the calf. The four compartments include the rumen, the omasum, the recticulum and the abomasum. In the newborn calf, milk travels down the esophagus through the esophageal groove into the abomasum. At later stages of development once the calf is on solid food the abomasum shrinks in size until it is a little more than a portion of the intestine. On the other hand, the newborn calf has a relatively small rumen stomach which at a later time becomes the primary stomach. It is our belief that the development of the rumen takes place after weaning.

GENERAL DESCRIPTION OF THE PRESENT INVENTION

In the present invention, the bovine such as newborn calves desirably are fed colostrum in an amount sufficient to provide the antibody protection which has been recognized in the past as important to the very early development. The bovine are then converted to a fluid milk material such as whole milk or a synthetic whole milk. The bovine at a very early age, for example as early as the first day following birth and at least by the third day, are fed palitable feed such as solid milk replacer pellets. The bovine are fed the liquid milk material and the solid milk replacer pellets through at least fourteen days of age. Desirably, at about fourteen to twenty one days of age, the fluid milk material feeding is terminated and the bovine are on a solid diet. Historically the bovine have undergone a shock often accompanied with a decrease in weight or weight gain at the time of removing the fluid milk material from the diet. In the present process, such shock does not take place and the bovine continue to gain at a very rapid rate.

Although it is not our intention to be bound by theory of why the present process works, it is believed that the esophageal groove in a newborn calf is stimulated by the liquid and forms a tube causing the liquid to go directly into the abomasum. We believe that in our process the milk replacer pellet drops into the rumen and thus does not go through the esophageal groove. It is believed the solid milk replacer pellet causes some fermentation in the rumen thereby stimulating the development of the rumen. Once the liquid milk material is eliminated and grain is added, rapid rumen development takes place. It is believed that at about four to five weeks of age the rumen is fully functional.

In the present invention, the newborn bovine ingests colostrum in an amount sufficient to provide antibody protection. Desirably, the colostrum is ingested for a period of one to three days following birth. The bovine is then converted to ingestion of a milk replacer which may be whole milk or a whole milk equivalent. Desirably, the milk replacer is ingested in an amount of about eight ounces twice each day up to the age of fourteen days. During this same period of time, the bovine ingests about eight ounces of solid milk replacer preferably in a pellet form. During the period of fourteen days of age to about forty two days, the bovine is also fed dry grain starting at amount of about four ounces per day and increasing in an amount to satisfy the appetite. During this entire period of time, the bovine is provided with a free choice of hay and water.

The solid milk replacer pellets may include by weight from 5 to 33 precent fat, up to 83 percent whey, up to 53 percent skim milk, up 38 percent sodium caseinate, up to 6 percent propylene glycol and up to 5 percent sodium bicarbonate. The solid milk replacer pellets desirably have protein content between 15 and 30 percent and a fat content of between 3 and 20 percent by weight. The pellets may further include various other materials such as neomycin sulfate, oxytetracycline, vitamins, minerals an other nutritional materials as desired. One preferred milk replacer pellet included 23 percent of a spray dried casein-whey-fat composition, 33 percent dried whey, 19 percent dried skim milk, 12 percent sodium caseinate and 3 percent propylene glycol.

EXAMPLE I

Twelve holstein bull calves were fed colostrum for three days and then fed 12 ounces of the solid milk replacer pellets for the next forty two days. In addition, the calves were fed liquid calf milk replacer for the first fourteen days. The solid milk replacer included by weight 23 percent fat, 33 percent whey, 19 percent skim milk solids, 12 percent sodium caseinate, 3 percent propylene glycol and 10 percent water. Thereafter, the calves were fed grain up to forty two days of age. The total weight gain was 38 pounds on the average for the forty two days. During the days 35–42 the average gain was 2.1 pounds per day. The observed health of the calves was excellent and no weaning stress was apparent following termination of the feeding of the liquid calf milk replacer.

EXAMPLE II

Twelve holstein bull calves were fed colostrum for the first three days and thereafter fed 8 ounces of solid milk replacer pellets up to forty two days of age. These calves were fed liquid milk replacer up to fourteen days of age and were fed grain to appetite for days 15–42.

What is claimed is:

1. A method for minimizing weaning stress in young bovine, said method comprising the steps of:

feeding colostrum to a new born bovine to provide antibody protection, feeding milk to said bovine for a period commencing at least by the third day following birth and continuing until at least fourteen days following birth, and also feeding solid milk replacer pellets commencing at least by the third day following birth and continuing until at least the fourteenth day following birth, feeding a combination of grain and solid milk replacer pellets for the period of time commencing with about the fourteenth day and at least until about the forty second day following birth and weaning said bovine from said milk at between the fourteenth day and the twenty-first day following birth.

2. The method of claim 1 wherein said milk replacer pellet comprises from about 15 to 30 percent protein and about 3 to 20 percent fat by weight.

3. The method of claim 2 wherein said milk replacer pellet comprises whey, caseinate, propylene glycol and sodium bicarbonate, said milk replacer pellet being fed in an amount of from 1 to 8 ounces per bovine per day.

4. The method of claim 1 wherein said solid milk replacer pellet comprises from 5 to 33 percent fat, up to 83 percent whey, up to 53 percent skim milk, up to 38 percent caseinate, up to 6 percent propylene glycol and up to 5 percent sodium bicarbonate.

5. The method of claim 4 wherein said solid milk replacer pellet comprises about 21 percent fat, 33 percent whey, 19 percent skim milk solids, 12 percent sodium caseinate and up to 5 percent sodium bicarbonate.

6. The method of claim 4 wherein said solid milk replacer pellet is fed in an amount of about 8 ounces per day during said at least fourteen days.

7. A method for early development of the rumen in newborn calves comprising the steps of feeding colostrum to provide antibody protection, feeding a fluid selected from the group consisting of whole milk and whole milk equivalent, commencing by the third day of age and continuing for up to twenty one days of age, at the same time feeding solid milk replacer commencing by the third day of age and continuing until said bovine are fourteen days of age and then feeding a combination of solid milk replacer and grain for up to forty two days following birth.

8. The method of claim 7 wherein said solid milk replacer comprises from 5 to 33 percent fat, up to 83 percent whey, up to 53 percent skim milk solids, up to 38 percent casinate, up to 6 percent propylene glycol and up to 5 percent sodium bicarbonate by weight.

9. The method of claim 8 wherein said solid milk replacer comprises by weight, about 21 percent fat, 33 percent whey, 19 percent skim milk solids, 12 percent caseinate and up to 5 percent sodium bicarbonate.

10. The method of claim 7 wherein said solid milk replacer comprises from 15 to 30 percent protein and 3 to 20 percent fat by weight.

11. The method of claim 10 wherein said solid milk replacer comprises about 22 percent protein and about 12 percent fat by weight.

12. The method of claim 7 wherein said colostrum is fed for from four to twenty four hours following birth.

13. The method of claim 7 wherein said solid milk replacer is fed in an amount of from 1 to 8 ounces per calf per day.

14. The method of claim 7 wherein hay and water are made available to said calf on an as wanted basis.

* * * * *

UNITED STATES PATENT AND TRADEMARK OFFICE
CERTIFICATE OF CORRECTION

PATENT NO. : 4,600,585

DATED : July 15, 1986

INVENTOR(S) : Marie A. Vitcenda et al.

It is certified that error appears in the above-identified patent and that said Letters Patent is hereby corrected as shown below:

Column 2, line 31, "an" should read -- and --.
Column 4, line 11, "83per-" should read -- 83 per- --.

Signed and Sealed this

Eleventh Day of November, 1986

Attest:

DONALD J. QUIGG

Attesting Officer

Commissioner of Patents and Trademarks